Dec. 30, 1930.  W. L. MYERS  1,786,770
SELF CLEANING RAKE
Filed Nov. 5, 1927
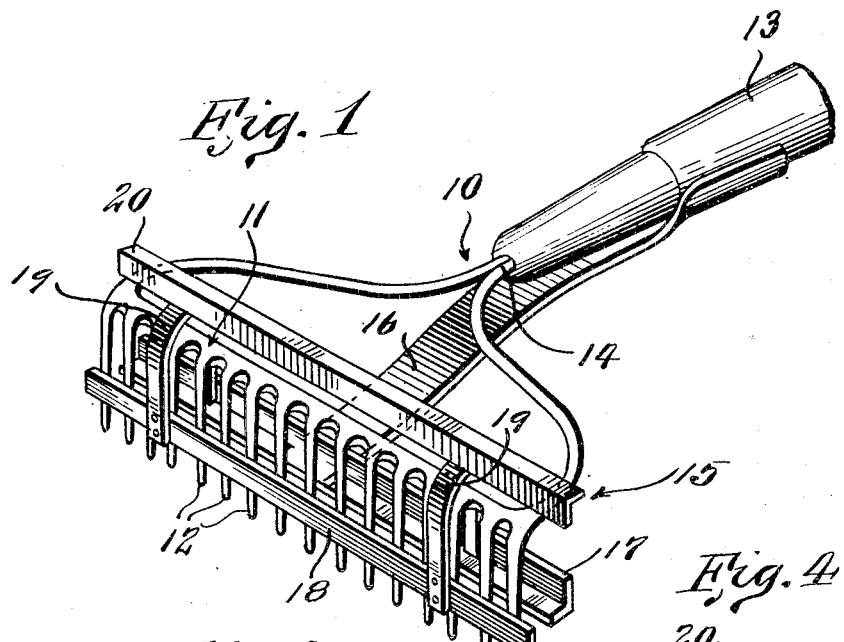
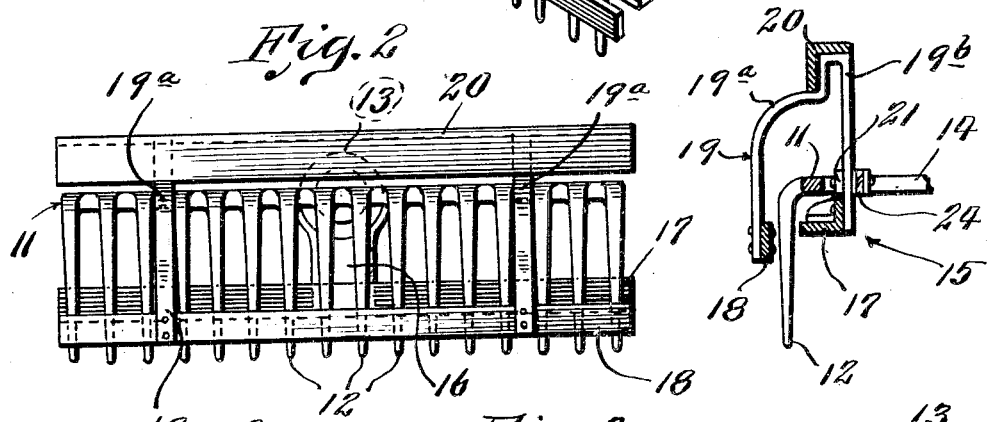
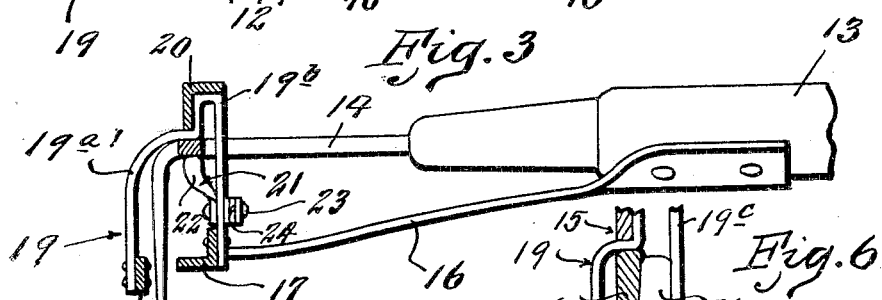
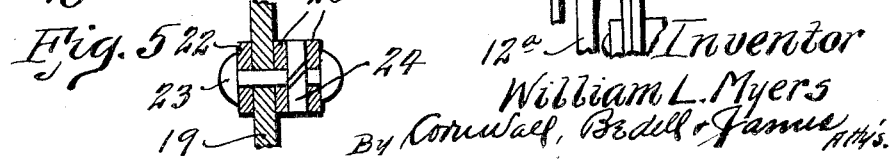
Inventor
William L. Myers
By Cornwall, Bedell & James Attys.

Patented Dec. 30, 1930

1,786,770

UNITED STATES PATENT OFFICE

WILLIAM L. MYERS, OF ST. LOUIS, MISSOURI

SELF-CLEANING RAKE

Application filed November 5, 1927. Serial No. 231,234.

This invention relates to new and useful improvements in self cleaning rakes, the objects of the invention being the provision of a garden rake having disposed adjacent to one or both sides of its toothed portion, a member, or members, extending the entire length of said portion and movable transversely thereof to release the material lodged between the teeth of the rake.

Other objects of the invention are to provide a device attachable to a garden rake and having yieldable movable means for cleaning the teeth of said rake, said means being adapted to be locked in rigid position and having a rigid bar disposed in spaced relation and parallel with the head of the rake whereby, by inverting said rake, said bar may be used for levelling or breaking clods of soil.

Additional objects of the invention are to simplify the construction of the device of the class described and enable the production thereof at low cost.

With these and other objects in view, my invention consists in certain novel features of construction, and arrangement of parts, hereinafter more fully described, and claimed and illustrated, in which—

Figure 1 is a perspective view of a garden rake equipped with my self cleaning device.

Figure 2 is a front elevation view thereof.

Figure 3 is a vertical cross section taken longitudinally of and to one side of the handle of the rake.

Figure 4 is a similar view but showing the cleaning device in moved position.

Figure 5 is a sectional detail view showing the means for mounting the locking member on said cleaning device.

Figure 6 is a modified form of the lock.

Referring by numerals to the accompanying drawings, 10 indicates a rake having a head 11 provided with the usual teeth or tines 12, and a handle 13 which is secured thereto, the shank 14 of head 11, all of which are of usual construction. The cleaning device 15 is secured in position by means of a flexible support or flat spring 16 having one end secured to handle 13 and extending longitudinally and forwardly thereof, towards the head 11. The forward end of member 16 is secured to a bar 17 which is disposed rearwardly and parallel with teeth 12 and is preferably in the form of angle iron. A bar 18 is disposed forwardly of and parallel with teeth 12 and is secured to bar 17 by means of inverted U-shaped members 19, which straddle the head 11 and have their ends secured to said bars 17 and 18, either by means of rivets or by spot welding. Bars 17 and 18 are spaced a suitable distance from teeth 12 so as to allow said bars to move in vertical plane with respect to said teeth. Member 16 is of sufficient resiliency to normally allow said bars to occupy downward positions as indicated in Figures 1 to 3, and to allow said bars to move upwardly under pressure exerted against said bars as, for instance, pressure produced against bar 17 by the material accumulated between teeth 12. As the material accumulates, bars 17 and 18 are gradually moved upwardly, member 16 being flexible enough to enable said bars to yield under pressure. When it is desired to clean the rake, the rake can be struck on the ground with teeth 12 presented downwardly, whereupon the bars 17 and 18 will be caused to move downwardly disengaging the material from between the teeth, or the rake can be raised from the ground and given a sudden jerk downwardly causing bars 17 and 18 to move downward with respect to teeth 12 and removing the material accumulated between the teeth.

The downward movement of bars 17 and 18 is limited by the crown portion 19a of U-shaped member 19, which overlie the head 11. Each crown portion 19a is preferably provided with an extension 19b to which is secured a horizontally disposed bar 20 which is arranged parallel with head 11 and is preferably formed of angle iron. This bar unites the upper ends of members 19 and reenforces the whole structure. In addition, said bar may be used for breaking clods and for levelling the soil.

A locking means 21 is provided for locking the device in downward position as shown in Figure 3. This means comprises a latch 22 pivotally mounted at 23 to the rear leg of each member 19 and having its free end extended to engage the underside of head 11 and thereby prevent the movement of bars 17 and 18 relatively to teeth 12, said device 15 being locked against downward movement by portions 19a and against upward movement by locking members 22. In order to hold member 22 in proper position, a spring washer 24 is interposed between two washers 25 on pivotal means 23 and exerts pressure against member 22 so as to frictionally hold it in adjusted position.

The locking means shown in Figure 6 are designed for use with rakes in which the head 11a is disposed substantially vertically in the same plane with the teeth or tines 12a. In this form the latch 26 is arranged to be wedged between head 11a and the rear leg 19c of member 19 to lock the cleaning device 15 in position.

By the use of my improved device the clogging of the tines or teeth of the rake is obviated and the material is readily discharged from the rake.

When the cleaning device is locked in downward position, only a small portion of the tines is exposed and bars 17 and 18 form guides or stops which prevent said tines from entering deeply the turf, so that the rake can be used successfully without danger of tearing up the turf.

While I have shown and described the preferred form of my invention, it is obvious that various changes can be made in the construction of my device without departing from the spirit of my invention.

I claim:

1. A self cleaning garden rake comprising in combination with a rake head, a resilient leaf spring support fixed at one end to the rake handle and extending forwardly therefrom and terminating short of said head, a bar disposed adjacent to one side of the teeth of said rake and secured to the forward end of said leaf spring support, another bar disposed adjacent to and forwardly of the teeth of said rake, said bars being spaced from said teeth and movable in planes parallel therewith, and means arched over said head for connecting said bars together whereby said bars can be moved by virtue of the resiliency of said leaf spring support relatively to said teeth to remove the material accumulated between the teeth of said rake.

2. A self cleaning garden rake comprising in combination with the toothed head, a resilient support fixed at one end to the rake handle and extending forwardly therefrom, a bar disposed adjacent to and spaced rearwardly of the teeth of said rake and secured to the forward end of said resilient support, another bar disposed adjacent to and spaced forwardly of the teeth of said rake, said bars being disposed parallel to each other and to said head, inverted U-shaped members extending over said head and connecting said bars together whereby said bars can be moved by virtue of the resiliency of said support member in planes parallel to said teeth to remove the material accumulated between the teeth of said rake, and manually operable means on one of said bars and engageable with said head for locking said bars in downward positions.

3. A self cleaning garden rake comprising in combination with the toothed head thereof, a leaf spring support fixed at one end to the rake handle and extending forwardly therefrom, a straight bar disposed adjacent to and spaced rearwardly of the teeth of said rake and fixed to the free end of said leaf spring support, a straight bar disposed forwardly of and spaced from said rake teeth, inverted U-shaped members straddling said head and secured at their ends to said bars, said U-shaped members securing said bars in parallel spaced relation with each other and with said rake head, said bars being flexibly supported by said leaf spring support and being yieldable upwardly during the raking operations and being adapted to be moved downwardly towards the ends of said teeth for removing the material accumulated between said teeth, and a straight bar connected to the crown portions of said U-shaped members and disposed above said toothed head.

4. A self cleaning garden rake comprising in combination with the toothed head thereof, a leaf spring support fixed at one end to the rake handle and extending forwardly therefrom, a straight imperforate bar disposed adjacent to and spaced rearwardly from the teeth of said rake and fixed to the free end of said leaf spring support, a straight imperforate bar disposed forwardly of and spaced from said rake teeth, inverted U-shaped members straddling said head and secured at their ends to said bars, said members securing said bars in parallel spaced relation with each other and with said teeth, said bars being yieldable upwardly during the raking operations and being adapted to be moved downwardly towards the ends of said teeth for removing the material accumulated between said teeth, and an angle iron secured to the crowns of said U-shaped members and extending in parallel spaced relation with said head.

5. A self cleaning garden rake comprising in combination with the toothed head thereof, a flexible support fixed at one end to the rake handle and extending forwardly therefrom and terminating short of said head an imperforate bar disposed adjacent to and spaced rearwardly from the teeth of said rake and fixed to the free end of said flexible member, an imperforate bar disposed forwardly of and spaced from said rake teeth, inverted U-shaped members straddling said head and secured at their ends to said bars, whereby said bars are held in rigid spaced relation with each other and with said rake head, said bars being yieldable upwardly during the raking operations and being adapted to be moved downwardly towards the ends of said teeth for removing the material accumulated between said teeth, an angle iron secured near its ends to the crowns of said U-shaped members and extending in parallel spaced relation with said head, and a latch pivotally mounted on one of said bars and engageable with said head for locking said bars in downward positions.

In testimony whereof I hereunto affix my signature this 31st day of October, 1927.

WILLIAM L. MYERS.